United States Patent
Savaresi et al.

(10) Patent No.: US 12,441,306 B2
(45) Date of Patent: Oct. 14, 2025

(54) AUTOMATIC CONTROL METHOD AND SYSTEM FOR THE VIRTUAL CONFINEMENT OF A LAND VEHICLE WITHIN A TRACK

(71) Applicant: POLITECNICO DI MILANO, Milan (IT)

(72) Inventors: Sergio Matteo Savaresi, Milan (IT); Matteo Corno, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 18/879,338

(22) PCT Filed: Jun. 21, 2023

(86) PCT No.: PCT/IB2023/056405
§ 371 (c)(1),
(2) Date: Dec. 27, 2024

(87) PCT Pub. No.: WO2024/003674
PCT Pub. Date: Jan. 4, 2024

(65) Prior Publication Data
US 2025/0162577 A1   May 22, 2025

(30) Foreign Application Priority Data
Jun. 30, 2022   (IT) .................. 102022000013876

(51) Int. Cl.
*B60W 30/095*   (2012.01)
*B60W 30/09*   (2012.01)
*B60W 30/12*   (2020.01)

(52) U.S. Cl.
CPC .......... *B60W 30/095* (2013.01); *B60W 30/09* (2013.01); *B60W 30/12* (2013.01)

(58) Field of Classification Search
CPC ..... B60W 30/095; B60W 30/09; B60W 30/12
See application file for complete search history.

(56) References Cited

U.S. PATENT DOCUMENTS

| | | | |
|---|---|---|---|
| 2003/0078712 A1* | 4/2003 | Shimakage | ............ B62D 1/286 |
| | | | 701/41 |
| 2010/0235099 A1* | 9/2010 | Sakai | ..................... G08G 1/166 |
| | | | 701/301 |

(Continued)

FOREIGN PATENT DOCUMENTS

EP   3095659 A1   11/2016

OTHER PUBLICATIONS

International Search Report and Written Opinion issued on Oct. 25, 2023, in corresponding International Application No. PCT/IB2023/056405, 10 pages.

(Continued)

*Primary Examiner* — Abby Lin
*Assistant Examiner* — Danielle M Jackson
(74) *Attorney, Agent, or Firm* — Maier & Maier, PLLC

(57) ABSTRACT

A method of automatic confinement of a land vehicle. The method includes defining a set of points of a track within which the vehicle is free to move, the track including at least one edge that defines a boundary of the track that must not be crossed by the vehicle determining a vehicle dynamic and position based on the information provided by plurality of sensors of the vehicle; calculating an intervention area of the track based on the current position and dynamic of the vehicle, and on the position from the at least one edge, the area to be avoided extending between the at least one edge of the track toward the current position of the vehicle within the track; determining whether the vehicle is at least partially in the intervention area; and controlling at least one actuator to modify the vehicle dynamic.

10 Claims, 8 Drawing Sheets

(56) References Cited

U.S. PATENT DOCUMENTS

2016/0200317 A1    7/2016    Danzl et al.
2017/0183004 A1    6/2017    Bonarens et al.
2024/0131877 A1*  4/2024    De Pinto ............... B60W 50/14
2024/0416942 A1* 12/2024   Resch ............... B60W 50/0097

OTHER PUBLICATIONS

Hoehener et al., "Design of a lane departure driver-assist system under safety specifications", 2016 IEEE 55th Conference on Decision and Control (CDC), Dec. 12, 2016, pp. 2468-2474.

* cited by examiner

AUTOMATIC CONTROL METHOD AND SYSTEM FOR THE VIRTUAL CONFINEMENT OF A LAND VEHICLE WITHIN A TRACK

TECHNICAL FIELD

The present invention refers to the automotive sector. In greater detail, the present invention concerns a method and a relative automatic control system for the virtual confinement of a vehicle on the racetrack.

BACKGROUND

At present, Electronic Stability Control (ESC) systems help the driver of a vehicle to keep the trajectory set by him or her, cancelling or at least significantly reducing the risk of an accident.

Furthermore, autonomous or semi-autonomous driving systems are known which overlap the driver's control by driving the vehicle in his or her stead according to a predetermined criterion, in particular to avoid collision of the vehicle with an obstacle on the track.

For example, US 2015/0302751 proposes a driver assistance method that intervenes by controlling the vehicle's brake and steering when sensors on board identify an obstacle. Similarly, U.S. Pat. No. 9,637,050 describes a driver assistance method that intervenes on steering and brake based on obstacles and information exchanged between vehicles and/or an electronic infrastructure surrounding the track of the vehicle—i.e., V2V vehicle-vehicle and V2I vehicle-infrastructure communications.

U.S. Pat. No. 10,882,518 discloses a driver assistance method which calculates a track to avoid the collision between a vehicle and an obstacle and, through an automatic brake and steering control system, imposes the vehicle to follow such a track. In addition, the method calculates a post-avoidance track to determine the presence of further obstacles to be avoided besides the first one.

Finally, JP 6654641 proposes an autonomous driving system of a vehicle that activates when predetermined conditions are detected—for example, the risk of collision with an obstacle—and transfers the control to the driver of the vehicle only when the driver's commands substantially correspond to the commands generated by the autonomous driving system.

In addition, D. Hoehener et al.: "Design of a lane departure driver-assist system under safety specifications", 2016, IEEE 55th Conference on Decision and Control (CDC), pages 2468-2474 and US 2017/183004 describe other autonomous or semi-autonomous driving systems that overlap the control of the driver.

The known solutions guarantee a greater driving safety, but are not suitable for the use of vehicles with an essentially performance/playful objective, for example in the case of driving on a racetrack. In fact, these methods and systems tend to excessively limit the maneuverability of the vehicle by the driver. This limits the possibility of the driver to improve his or her own driving skills and to learn a sporty and/or safe driving style, and more generally, limits driving fun.

Therefore, there is a need in the sector for driver assistance methods and systems that allow a driver to drive the vehicle without interferences with the driver's driving style, for example a sporty driving style, while ensuring the safety of the driver and of the vehicle.

SUMMARY

Aim of the present invention is to overcome the drawbacks of the prior art.

In particular, aim of the present invention is to provide a method and a system capable of ensuring the safety of the driver and of the vehicle without interfering with the driving style of the driver.

In particular, a further aim of the present invention is to provide a method and a relative system such as to identify a dynamic condition of the vehicle that causes an exit from a permitted track, such as a racetrack exit, of a vehicle and to promptly correct the vehicle dynamic in order to avoid the racetrack exit.

In fact, the Applicant has found that the known ESC systems are not able to guarantee that the vehicle is kept on the racetrack if the driver sets an incorrect trajectory, for example by excessively delaying the apex point.

These and other objects of the present invention are achieved by a system incorporating the features of the accompanying claims, which form an integral part of the present description.

According to a first aspect, the present invention is directed to a method of automatic confinement of a land vehicle. The vehicle considered comprises a control unit, a plurality of sensors configured to measure quantities indicative of a vehicle dynamic, at least one actuator configured to influence the dynamic of the vehicle, said plurality of sensors and said at least one actuator being connected to the control unit.

In the embodiments of the present invention, the method provides that the control unit defines a set of points of a track within which the vehicle is free to move, said track including at least one edge that defines a boundary of the track that must not be crossed by the vehicle. Preferably periodically, the control unit determines the vehicle dynamic and the spatial position of the vehicle based on the information provided by the plurality of sensors.

Starting from the position and dynamic of the vehicle, and from the position of the at least one edge, the control unit calculates an intervention area.

Then, the control unit determines whether the vehicle is at least partially in the intervention area and, in affirmative case, controls the at least one actuator to modify the vehicle dynamic to perform an exit maneuver that brings the vehicle outside said intervention area.

The term "dynamic" refers here to a set of information relative to the movement of the vehicle in space as a function of time. Preferably, but not in a limiting way, the dynamic of a vehicle comprises the following information: longitudinal speed, lateral speed, yaw rate, direction of advancement, yaw angle, steering angle and the individual wheel speeds. Optionally, the vehicle dynamic also comprises information regarding the roll and pitch speed, and the suspension elongations. As will be apparent to the person skilled in the art, the information included in the vehicle dynamic makes it possible to calculate a plurality of derived information such as the corresponding longitudinal, lateral and yaw acceleration values associated with the vehicle.

In particular, calculating an intervention area comprises performing the following steps. A first collision area, based on the current position and dynamic of the vehicle, the position from the at least one edge and an ability to modify the vehicle dynamic of the driver by acting on said at least one actuator, and a second collision area based on the current position and dynamic of the vehicle, the position from the at least one edge and an ability to modify the vehicle dynamic of the control unit acting on said at least one actuator are calculated. The first collision area and the second collision area correspond to regions of the track within which reaching and/or crossing said at least one edge is inevitable when the vehicle moving according to the current dynamic is driven by the driver or by the control unit, respectively. Finally, the intervention area is defined as the area resulting from the difference between the first collision area and the second collision area.

The method guarantees an ample driving freedom to the driver, but at the same time prevents the vehicle from exiting the designated track and therefore any damage to the vehicle and/or to the driver resulting from such an event.

The method according to the embodiments of the present invention completely overturns the concept of controlling the stability of a vehicle. In fact, the method eliminates any driver assistance, with the driver being free to operate the vehicle commands, without any overlap by the stability control system. This allows the possibility to try new driving styles and ensures maximum driving fun.

At the same time, however, a continuous monitoring of the vehicle is carried out and, if it is detected that the dynamic state of the vehicle has reached the intervention area, i.e. a boundary of feasibility of a trajectory that keeps the vehicle within the designated track, for example a racetrack, a rapid overlap with the driver's commands allows to correct the vehicle dynamic in order to keep the vehicle on the track.

In fact, the calculation of the two collision areas allows to identify in a precise manner the optimal intervention area that guarantees to avoid the collision with the edge of the track while minimizing the intervention on the driver's driving.

In other words, the intervention area thus calculated guarantees a sufficient edge of space and time so that the control unit intervenes to correct the vehicle dynamic only when actually necessary.

As will be apparent to the person skilled in the art, the method does not need exteroceptive sensors—cameras, radar, LiDAR—for its implementation. In other words, the method according to the embodiments of the present invention can be implemented in vehicles provided with "standard" on-board instrumentations for the automotive sector. Furthermore, by not requiring the presence of exteroceptive sensors the method according to the embodiments of the present invention can be implemented on a vehicle without this being overloaded and/or its aerodynamics being reduced by the presence of this type of sensors.

In one embodiment, the method comprises the step of determining the ability of the driver to modify the vehicle dynamic by selecting at least one value indicative of the ability to modify the vehicle dynamic from a set of predetermined values.

Preferably, the values are based on the analysis of the driving performance, on the track considered, of a plurality of sample drivers.

Thanks to this solution it is possible to easily and quickly define the driver's ability to modify the vehicle dynamic with no need to carry out a test on the racetrack or a simulated test.

In an alternative embodiment, the ability of the driver to modify the vehicle dynamic is determined by measuring at least one value indicative of the ability to modify the vehicle dynamic while the driver drives said vehicle, for example on a racetrack or through a simulation.

In this way it is possible to evaluate with precision the actual ability of the driver to modify the vehicle dynamic and obtain a "tailor-made" driver assistance.

In one embodiment, the value indicative of the ability to modify the dynamic of the vehicle comprises at least one among a maximum steering speed, and maximum braking and acceleration that can be performed by the driver.

In one embodiment, the steps of calculating a first collision area and a second collision area each comprise calculating a sub-set of points starting from which any trajectory that can be set by the driver or by the control unit, respectively, leads to reaching/crossing of the at least one edge based on the vehicle dynamic according to the reachability problem.

This solution makes it possible to precisely and reliably define collision areas.

In one embodiment, the method provides for calculating an intervention area for each of the edges of the track travelled by the vehicle.

In this way, it is possible to promptly correct the vehicle dynamic at any moment during the movement of the vehicle.

Alternatively, the at least one edge corresponds to the edge of the track intersected by the direction of advancement of the vehicle, or the edge of the track which is less than a threshold distance value from the vehicle position.

Simply and quickly identifying the relevant edge with respect to which performing a correction intervention of the vehicle dynamic is more likely to be necessary allows to limit the computational load performed by the control unit.

In one embodiment, the step of defining a set of points of a track within which the vehicle is free to move comprises acquiring geographic data relating to a geographic area comprising said track, identifying the geographic coordinates of said track based on the geographic data acquired.

Consequently, the geographic coordinates of the track are defined to correspond to the points of the track, while the remaining geographic coordinates as points not belonging to the track. Finally, the at least one edge is defined as a subset of the points of the track adjacent to each other and to at least one point not belonging to the track.

This definition of the track that can be travelled by the vehicle is particularly easy to perform and requires a contained storage space. Accordingly, the track may be calculated by an electronic device having contained resources and/or may be rapidly transferred via a wired or wireless connection.

In one embodiment, it is possible to add to the set of points of the track the coordinates of at least an additional area adjacent to a portion of the set of points of the track, said additional area being suitable for the transit of the vehicle.

Thanks to this operation it is possible to define the track within which to contain the movement of the vehicle based on the actual conformation of the geographic area that contains the track, the type of vehicle and/or the driving style of the driver.

In one embodiment, controlling the at least one actuator to modify the vehicle dynamic comprises calculating an exit trajectory from the intervention area based on the current position and dynamic of the vehicle, and the distance of the vehicle from the at least one edge, and executing said exit maneuver by controlling said at least one actuator to follow said exit trajectory.

Preferably, the exit trajectory is calculated as a solution of the following relation:

$$\max_{u} \sum_{t \in T} d_{ost}(x(t)),$$

such that $$\dot{x} = f(x, u),$$
$$d_{ost}(x(t)) > d_{min},$$

where t denotes time, T is the prediction period, where f(x,u) represents the vehicle dynamic, $d_{ost}(x)$ is the distance between the vehicle and the at least one edge, $d_{min}$ is a threshold distance value allowed between the vehicle and said at least one edge, x represents the position of the vehicle in space, and u represents the dynamic variables controllable by means of said at least one actuator.

The exit trajectory is calculated in a simple and fast way which allows to modify the vehicle dynamic in a timely manner to ensure that the track exit avoided.

A different aspect of the present invention concerns a vehicle comprising a control unit, a plurality of sensors configured to measure quantities indicative of a vehicle dynamic, at least one actuator configured to influence the dynamic of the vehicle. The plurality of sensors and the at least one actuator are connected to the control unit.

Further, the control unit is configured to perform the method according to any one of the above-mentioned embodiments.

The vehicle provided with the characteristics set out above allows to obtain the same advantages listed above.

Further features and advantages of the present invention will be more evident from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and reference numerals illustrating structures, components, materials and/or similar elements in different drawings are indicated by similar reference numerals, where appropriate.

DETAILED DESCRIPTION OF THE EMBODIMENTS

Figure 1:
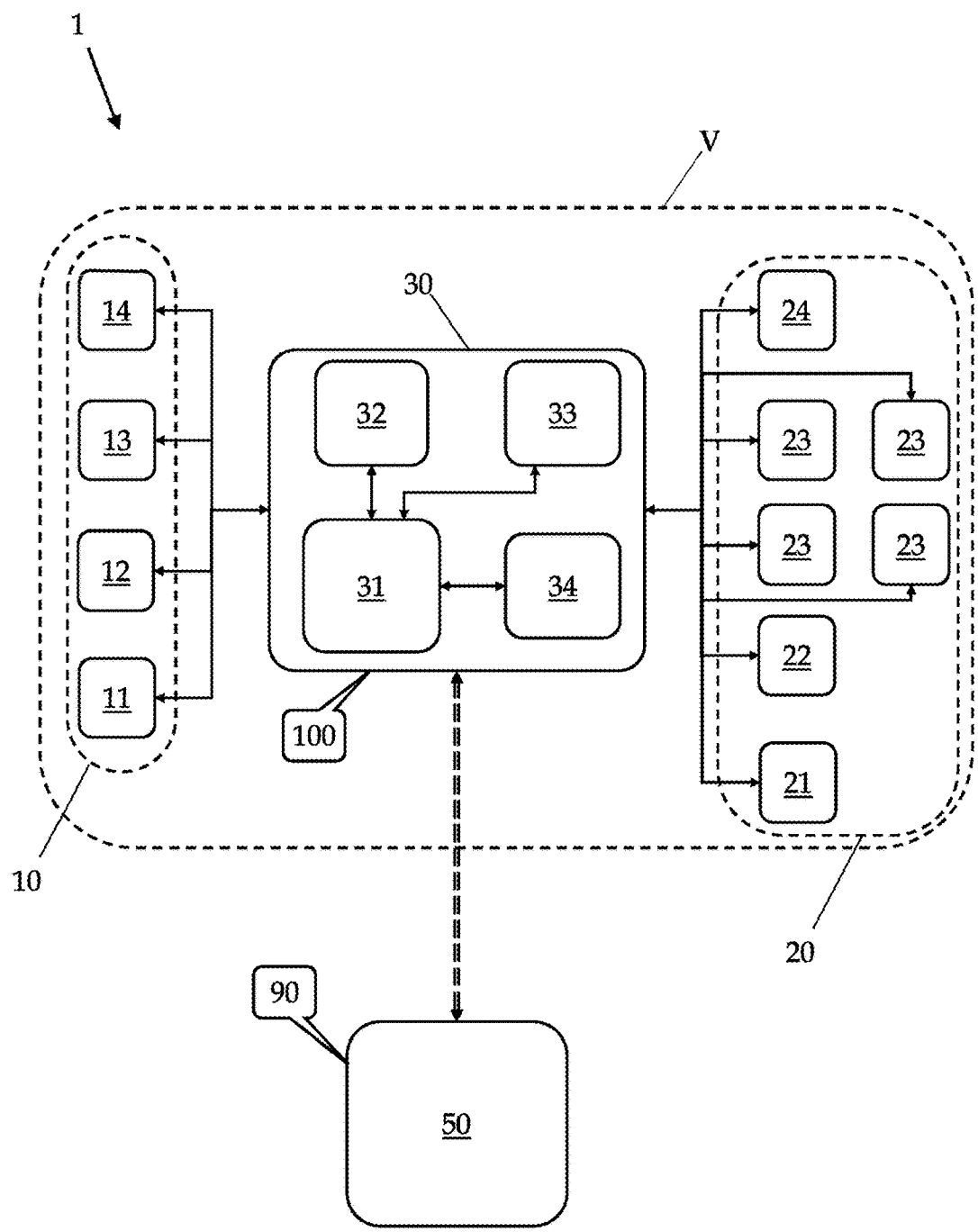
FIG. 1 is a block diagram of a system according to an embodiment of the present invention.

While the invention is susceptible to various modifications and alternative constructions, some preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" denotes non-exclusive alternatives without limitation, unless otherwise indicated. The use of "includes" means "includes, but not limited to" unless otherwise indicated.

With reference to the block diagram of FIG. 1 an automatic control system for the virtual confinement of a vehicle on the racetrack according to an embodiment of the present invention, hereinafter simply the "system 1", is comprised in a vehicle V, a car in the example considered.

The system 1 comprises a plurality of actuator groups—as a whole denoted by the reference numeral 10—, known per se and not described in detail here for brevity's sake. In the non-limiting example considered herein, the system 1 comprises:

an actuator group 11 of the steering, or active steering, and
a brake pump pressure control group 12 (or master cylinder).

Preferably, although not in a limiting manner, the following actuator groups are also included:

an actuator group of the drive torque 13, and
a brake torque control unit 14 that acts independently on each of the wheels of the vehicle V.

Furthermore, the system 1 comprises a plurality of sensors—as a whole denoted by the reference numeral 20, in particular:

a positioning sensor 21 of the vehicle V, for example a satellite positioning system GNSS (acronym for Global Navigation Satellite System) or a positioning system based on cameras, localization algorithms;
an inertial platform 22, preferably barycentric with six degrees of freedom—for example, comprising three accelerometers and three gyrometers;
at least one speed sensor 23 coupled to one of the wheels of the vehicle; preferably a speed sensor 23 for each of the wheels of the vehicle V, and
a steering angle sensor 24.

Finally, the system 1 comprises a processing unit, or control unit 30, configured to drive the actuator groups 10 and to acquire the measurements provided by the sensors 20. In the example considered, the control unit 30 comprises one or more computers 31—such as processors, microprocessors, microcontrollers, ASIC, FPGA, DSP or the like—, a memory module 32—provided with one or more non-volatile and volatile memory elements—and ancillary modules such as a power module 33 and a communication module 34—for example, configured to exchange data via a CAN/LIN bus and/or via a wireless communication channel—e.g., Bluetooth, Wi-Fi, ZigBee, etc.

Figure 2:
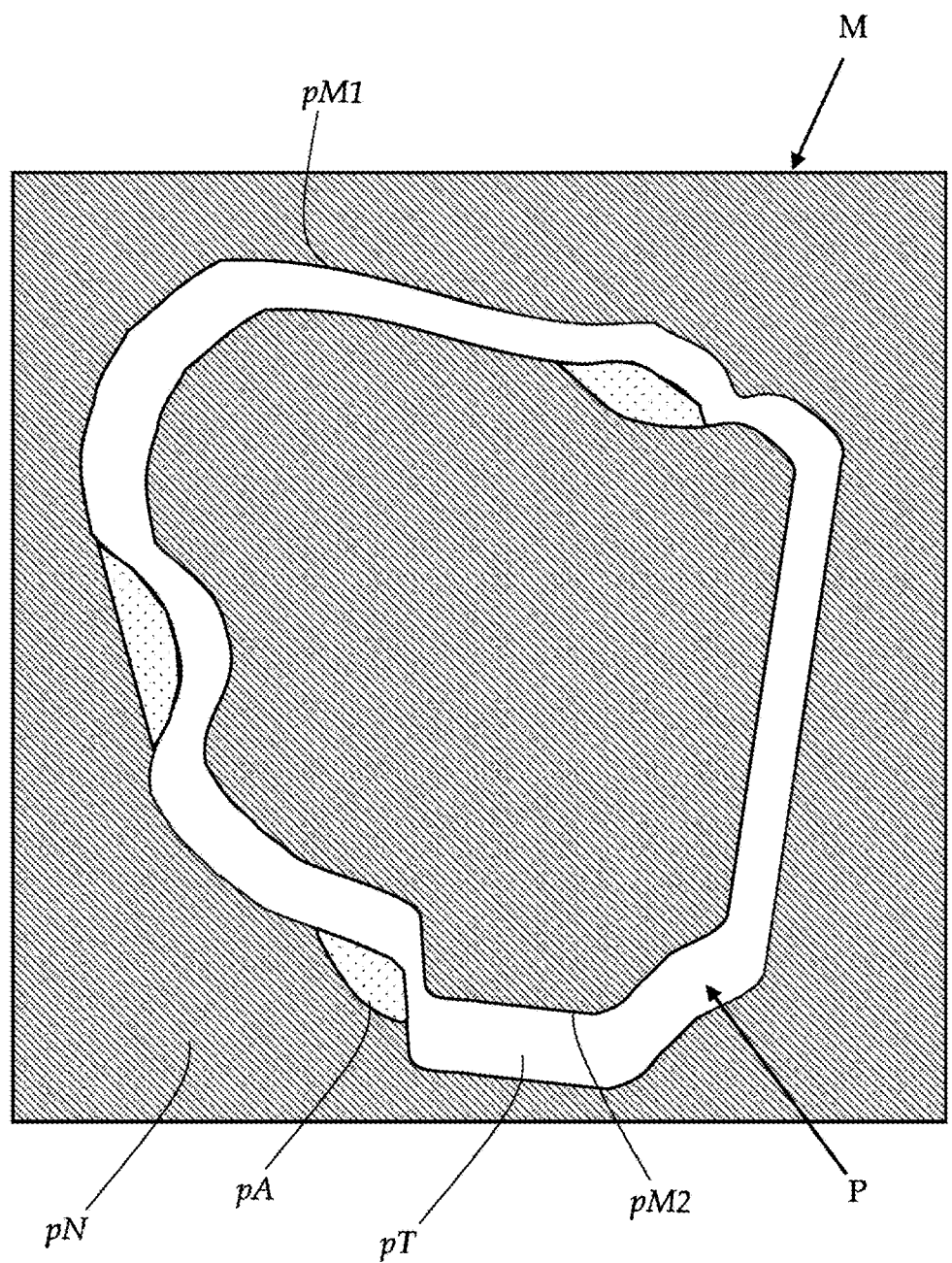
FIG. 2 is a qualitative representation of a map of a track that can be travelled by a vehicle according to an embodiment of the present invention.

In the embodiments of the present invention, the control unit 30 stores information of the track that can be travelled, simply track hereinafter. In the example considered, the control unit 30 stores a detailed map M of a circuit or racetrack P that can be travelled by the vehicle V schematically depicted in FIG. 2. The map M defines the racetrack P by means of a set of points corresponding to geographic coordinates, preferably provided by the same positioning system used by the positioning sensor 21.

In the embodiments of the present invention, the map M substantially comprises two sets of points:
a. a set of track points pT in which the presence of the vehicle is allowed, and
b. a set of non-track points pN in which the presence of the vehicle is not allowed.

In general, the points of the set of track points pT correspond to the surface of the racetrack P on which the vehicle V is expected to travel. Optionally, the set of track points pT may include points pA belonging to portions of additional surfaces, for example: escape ways, secondary paths of the racetrack P and/or areas adjacent to the racetrack P on which the vehicle V can travel without being damaged. Otherwise, the non-track points pN comprise all the remaining points of the map M.

In the embodiments of the present invention, the set of edge points pM is defined, which is a sub-set of the track points pT that are adjacent to at least one non-track point pN.

Figure 3:
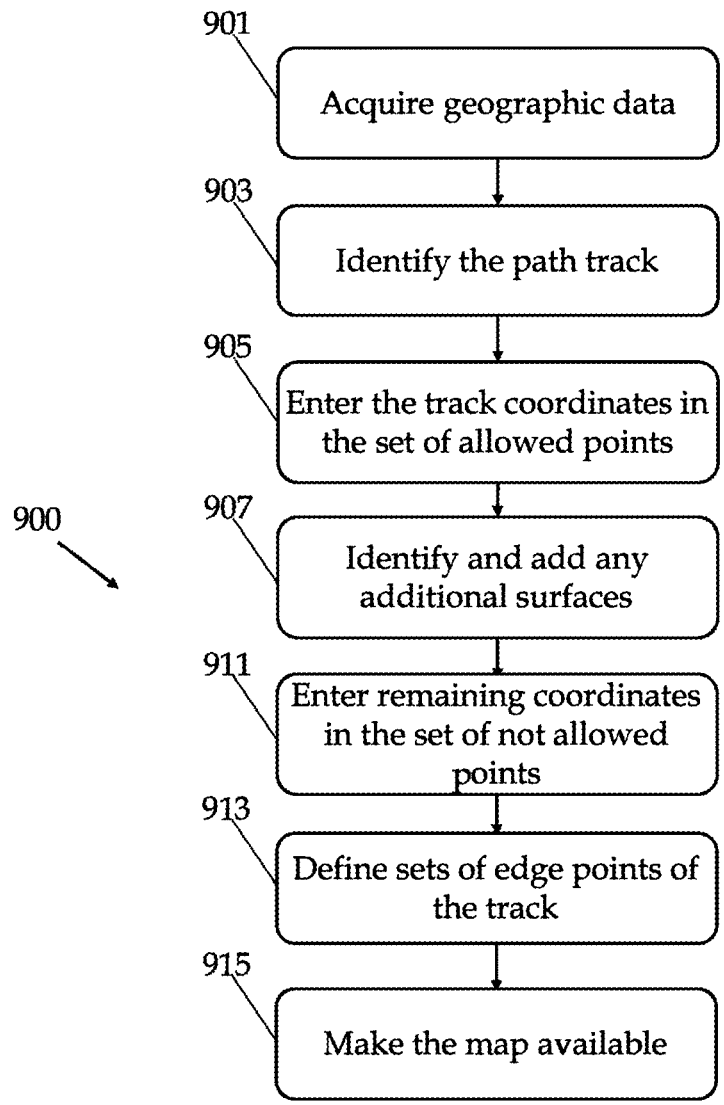
FIG. 3 is a flowchart of a mapping method according to an embodiment of the present invention.

In one embodiment, the map M of the racetrack P is created by means of a mapping method 900 described below, of which FIG. 3 is a flowchart. Preferably, the method 900 is executed by an electronic device 50 external to the vehicle V (illustrated in FIG. 1), for example a general purpose computer provided with a software application 90 suitably configured to perform the method 900.

Initially, geographic data of the area comprising the racetrack P are acquired (step 901). The geographic data comprises one or more among geographic coordinate sets defined by one or more GNSS, GIS—Geographic Information System—data, cartographic data, aerial/satellite images, etc. Such geographic data are acquired by one or more corresponding computer systems (not illustrated, for example, a geographic map repository comprising GPS coordinates).

The track that defines the racetrack P is thus identified (step 903). This operation may be performed manually and/or by a software application configured to identify the track of the racetrack P by analysing one or more satellite images of the area comprising the racetrack P.

The geographic coordinates corresponding to the identified racetrack P are thus added to the set of track points pT (step 905).

Optionally, any additional surfaces are identified manually and/or by means of a software application, whose points pA are added to the set of track points pT (step 907). For example, the software application is configured to identify possible additional surfaces based on the analysis of one or more satellite images of the area comprising the racetrack P and the addition of the points pA associated with these additional surfaces is then confirmed manually by a human operator.

The remaining coordinates are added to the set of non-track points pN (step 911).

Subsequently, the edge points pM are identified (step 913). Advantageously, the edge points are further divided into a pair of edge sub-sets pM1 and pM2 each comprising coordinates adjacent to each other. In other words, each sub-set of edge points pM1 and pM2 comprises the points defining one of the two edges of the racetrack P.

Finally, the map M-comprising the set of track points pT, the sub-sets of edge points pM1 and pM2, and the set of non-track points pN—is made available for transfer to the control unit 30 of one or more vehicles V (step 915).

The map M is then transferred to the control unit 30, connecting the electronic device 50 to the control unit 30 via a wired or wireless connection.

In the embodiments of the present invention, the control unit 30 performs a method 1000 of automatic confinement of the vehicle V, which has the purpose of protecting the driver from risk conditions, while limiting as little as possible the freedom of maneuver of the driver.

Figure 4:
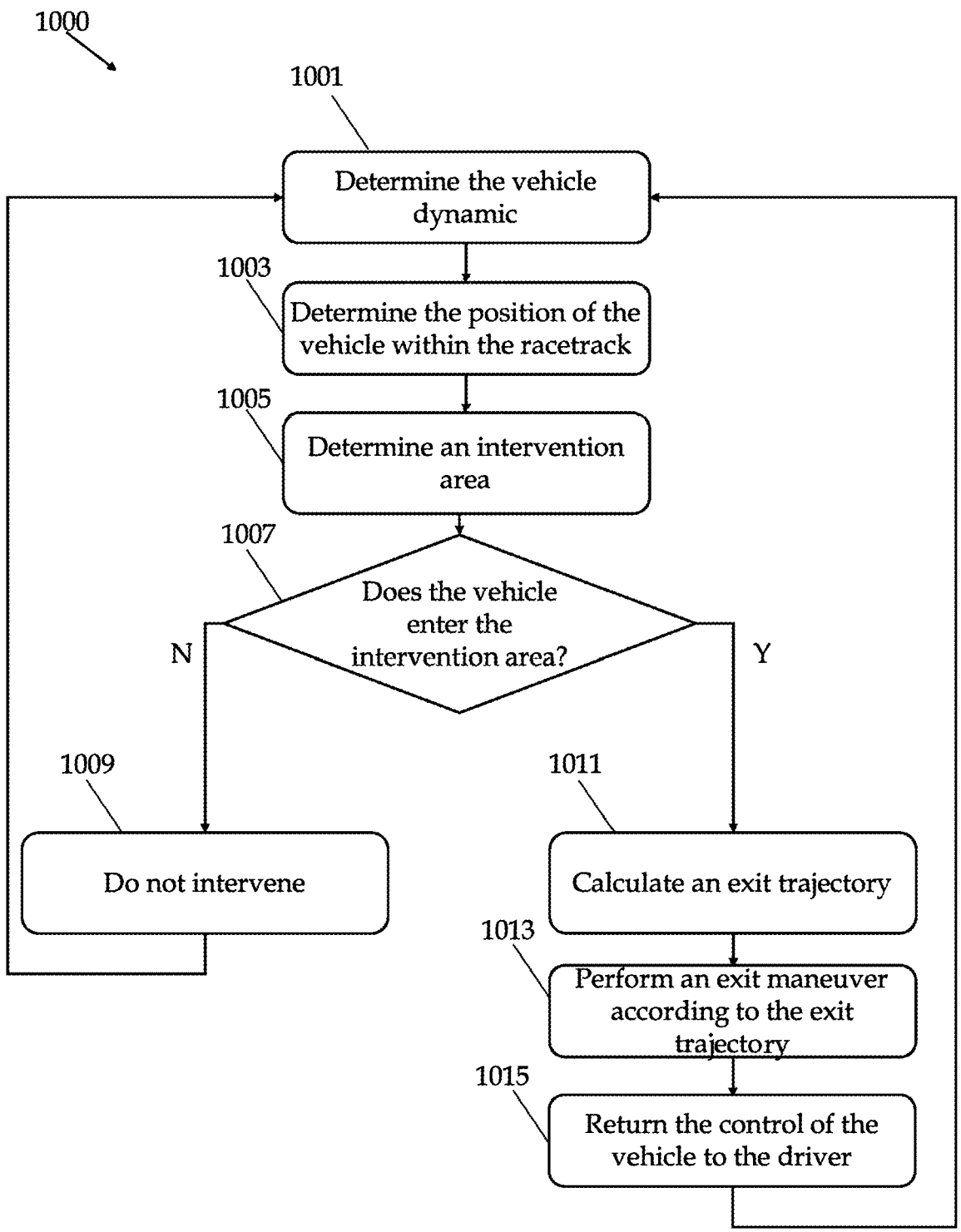
FIG. 4 is a flowchart of a method of confinement of a vehicle according to an embodiment of the present invention.

The method 1000, of which FIG. 4 is a flowchart, provides for performing the following steps, preferably periodically—for example, with a sampling period comprised between about 5 and 10 milliseconds:

determining (step 1001) a dynamic of the vehicle V, wherein by the term "dynamics" is meant a set of information relating to the movement of the vehicle in space as a function of time comprising, but not necessarily limited to: longitudinal speed, lateral speed, yaw rate, yaw angle, steering angle and the individual wheel speeds—optionally, also roll and pitch speeds, and suspension elongations;

determining (step 1003) a position of the vehicle V within the racetrack P included in the map M, obtained through the positioning sensor 21 and/or through a dead reckoning operation based on the values provided by the inertial platform 22 or through a positioning algorithm—in the example considered, the position of the vehicle V corresponds to the position of the centre of mass of the vehicle V;

calculating (step 1005) at least one intervention area Zi contained in the racetrack P—that is, included in the set of track points pT—based on the position of the vehicle V—in particular, in relation to the points of the edge sub-sets pM1 and pM2—, of the dynamic of the vehicle V and of the type of control that the control unit 30 can exercise on the vehicle V;

determining (decision step 1007) whether the vehicle V enters at least partially into the intervention area Zi;

if the vehicle has not entered into the intervention area Zi (exit branch N of step 1007), the method provides for not performing (step 1009) any intervention Zi, leaving the control of the vehicle V entirely to the driver;

if, on the other hand, the vehicle has entered into the intervention area Zi (exit branch Y of step 1007), the method 1000 provides for calculating a trajectory of exit from the correction area that keeps the vehicle V within the racetrack—that is, included in the area defined by the set of track points pT—(step 1011);

controlling (step 1013) the actuators 10 of the vehicle V to modify the dynamic of the vehicle V so as to perform an exit maneuver that follows the calculated exit trajectory, and returning (step 1015) the control of the vehicle V to the driver after performing the exit maneuver.

Preferably, the method 1000 is repeated at the exit of step 1007 or of step 1011 as long as the vehicle V is moving on the racetrack P.

In one embodiment of the present invention, the control unit 30 stores and executes a software product 100 implementing the method 1000.

Figure 5:
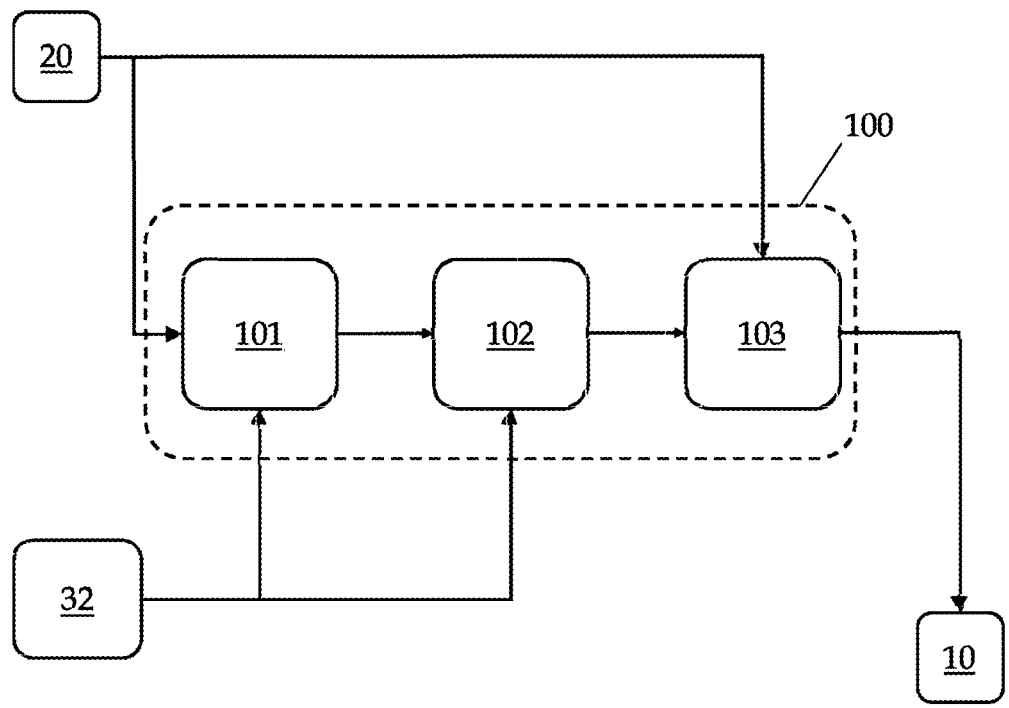
FIG. 5 is a logical block diagram of a software application executed by a control unit on board a vehicle according to an embodiment of the present invention.

In the example considered, the software 100 executed by the control unit 30 implements three main logic modules—as illustrated in the block diagram of FIG. 5: an unavoidable collision set calculation module, or module ICS 101 (acronym for Inevitable Collision Set), a reference generation module, or module RG 102 (acronym for Reference Generation), and a vehicle dynamics control module, or module VDC 103 (acronym for Vehicle Dynamics Control).

As described in greater detail below, the module ICS 101 is configured to define, preferably in real time, one or more intervention areas Zi (steps 1001-1005 of the method 1000). The module RG 102 is configured to calculate the trajectory of exit from the intervention area Zi (steps 1007-1011 of the method 1000). Finally, the module VDC 103 is configured to operate the actuators 10 so that the vehicle V follows the exit trajectory calculated by the module RG 102 and the return of the control of the vehicle to the driver (steps 1013 and 1015 of the method 1000).

Figure 6:
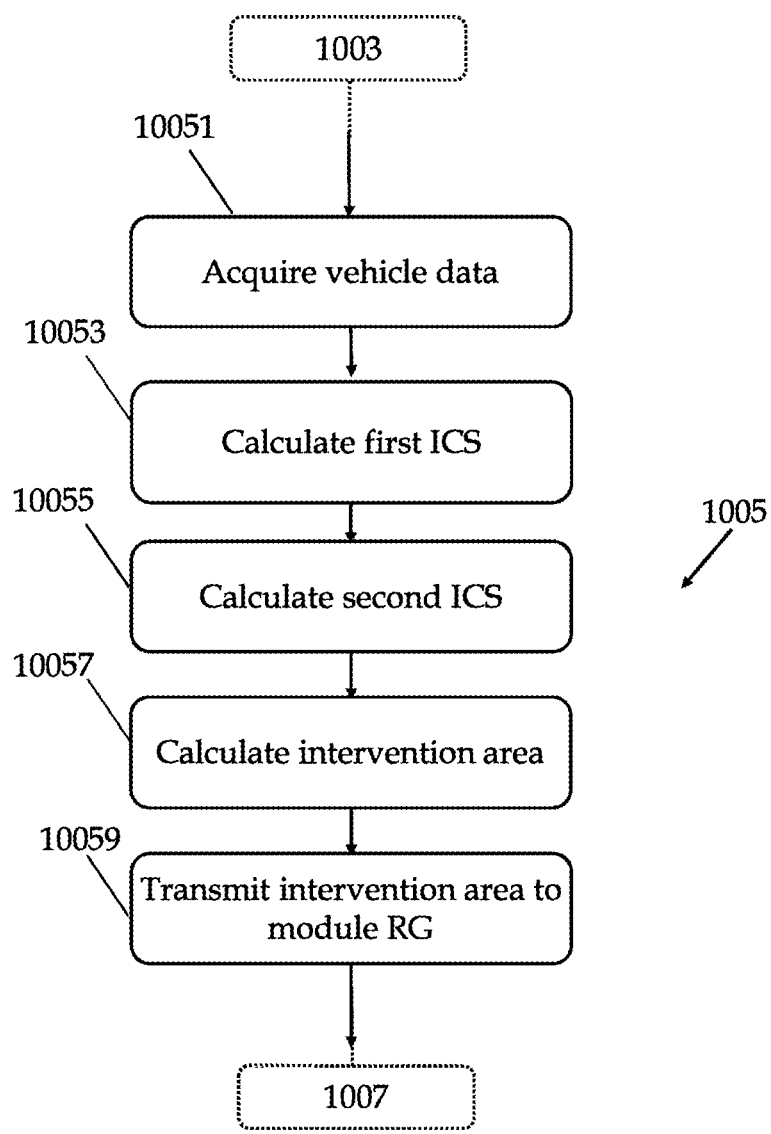
FIG. 6 is a flowchart of a procedure for calculating an intervention area included in the flowchart of FIG. 4 and implemented by a module of the software application of FIG. 5.

In detail, the definition of the intervention area Zi provides that the module ICS 101 performs the following sub-steps, illustrated in the flowchart of FIG. 6.

Preliminarily, for example in a system initialization step, the module ICS 101 acquires (step 10051) the following data relating to the vehicle V (for example, stored in the memory module 32):

a set of characteristics of the vehicle V, for example including but not limited to the type of tyres fitted, the nominal friction of the vehicle V, the wheelbase of the vehicle V, and the mass of the vehicle V;

a control configuration—that is, which actuators 10 can be controlled autonomously by the control unit 30, for example selected among:
  a) active brake only,
  b) active brake and active steering,
  c) active steering and torque vectoring—that is, the ability to impose a desired yaw moment (for example, through differential torques), or
  d) active steering only;

an ability to modify the dynamic of the vehicle V of the control unit 30—for example, a response time necessary to the control unit 30 to control one or more of the actuators 10 (e.g., to perform a braking and/or a steering) in order to modify the dynamic of the vehicle V, a maximum steering speed (measured in rad/s), a maximum braking or acceleration ability (i.e., deceleration measured in m/s), an ability to impart an additional yaw moment through torque vectoring or differential braking (measured in Nm), etc.—, and an ability to modify the dynamic of the vehicle V of the driver—e.g., a response time necessary for the driver to provide a command to the vehicle (e.g., to perform a braking and/or a steering), a maximum steering speed (measured in rad/s), a maximum braking or acceleration ability (i.e., deceleration measured in m/s), etc. in response to an external stimulus (e.g., the presence of an obstacle or the setting of a curve).

The characteristics of the vehicle V, the control configuration thereof and the ability to modify the dynamic of the control unit 30 are known data, for example provided by the manufacturer/fitter of the vehicle V by means of the device 50 to the control unit 30 in a manner analogous to what is described above in relation to the map M. Otherwise, the ability to modify the dynamic of the driver is selected from a set of values—preferably, adjustable based on a level of experience of the driver. In one embodiment, the values are based on the analysis of the driving performance on the track considered of a plurality of sample drivers—for example, for each driver the maximum steering speed and the maximum deceleration (or acceleration) set by the driver by means of the actuators under his or her control are calculated; these two measurements are then weighed for a value indicative of the degree of experience of the driver driving the vehicle and are included in the aforementioned set of values.

Alternatively, the ability to modify the dynamic of the driver is determined empirically during a preliminary calibration step of the system 1 by means of a real or simulated driving test.

Based on the acquired data of the vehicle V and the measurements provided by the sensors 20, the module ICS 101 is configured to determine an intervention area for each sub-set of edge points pM1 and pM2, also simply referred to as edges pM1 and pM2 hereinafter for brevity's sake, of the racetrack P, preferably in parallel. Below, for simplicity's sake, are described the steps to calculate the intervention area with respect to only one of the edges, the edge pM1, but the same procedure is performed for the other edge pM2 of the racetrack P mutatis mutandis.

The module ICS 101 calculates (step 10053) a first collision area $ICS_1$ of the racetrack P referred to the edge pM1, i.e. a set of track points pT, called Inevitable Collision Set. In particular, when the vehicle V enters into the first collision area $ICS_1$, the driver, by acting only with the actuators under his or her control, and considering the boundaries discussed above, is not able to perform a maneuver such as to prevent the vehicle V from reaching the edge pM1 and exiting from the racetrack P.

Furthermore, the module ICS 101 calculates (step 10055) a second area $ICS_2$ of the racetrack P. In particular, when the vehicle V enters into the first collision area $ICS_1$, the control unit 30, by acting with all the actuators under its control, is not able to perform such a maneuver as to prevent the vehicle V from exiting from the racetrack P.

Figure 7:
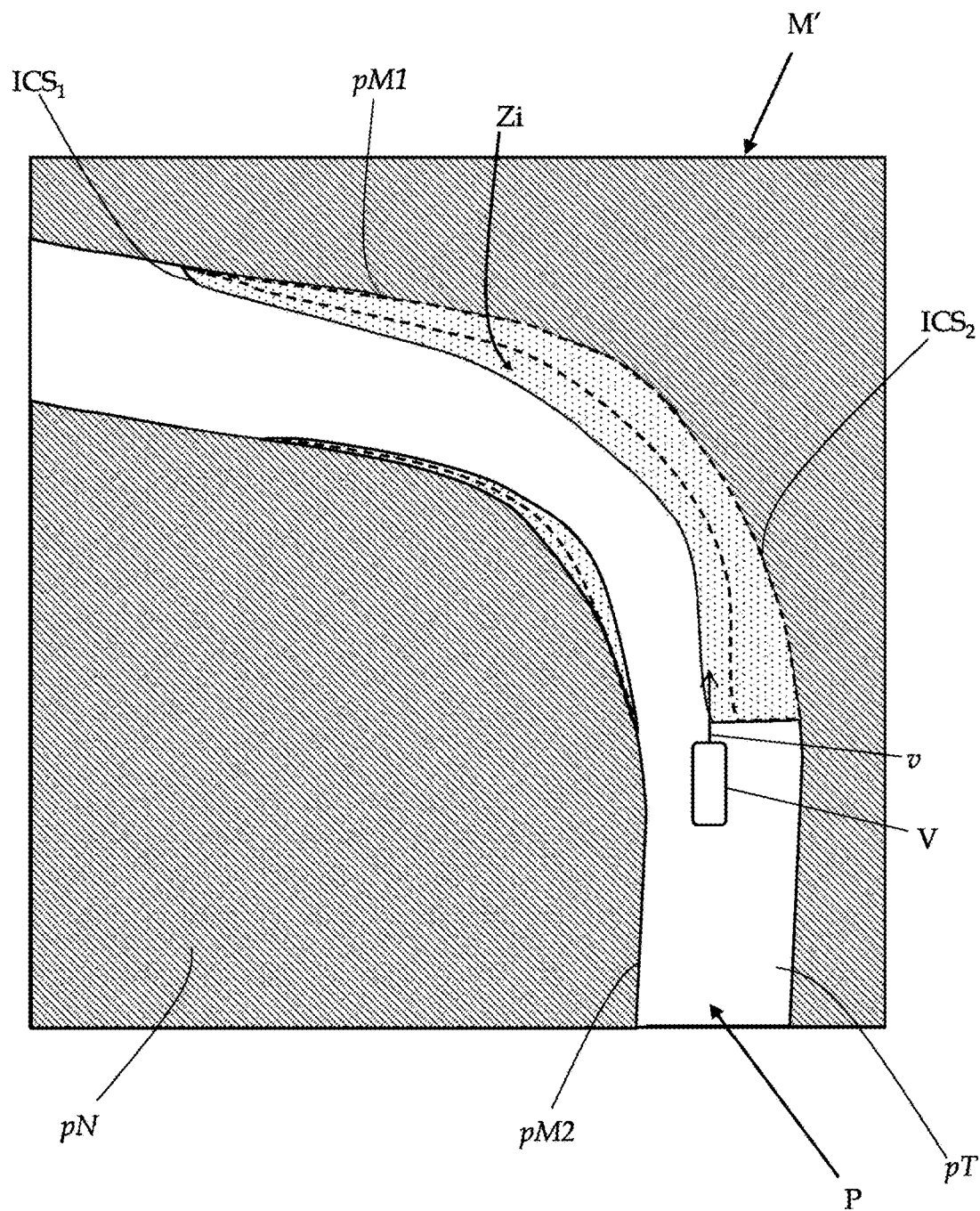
FIG. 7 is a qualitative representation of the intervention area calculated through the procedure of FIG. 6.

As schematically illustrated in FIG. 7, the collision areas $ICS_1$ and $ICS_2$ extend from the edge pM1 of the racetrack P and extend inwardly of the racetrack P. In particular, the first collision area $ICS_1$ has a wider surface than the second collision area $ICS_2$ due to the greater ability to modify the dynamic of the control unit 30 than the ability of the driver to modify the dynamic of the vehicle V.

Figure 8:
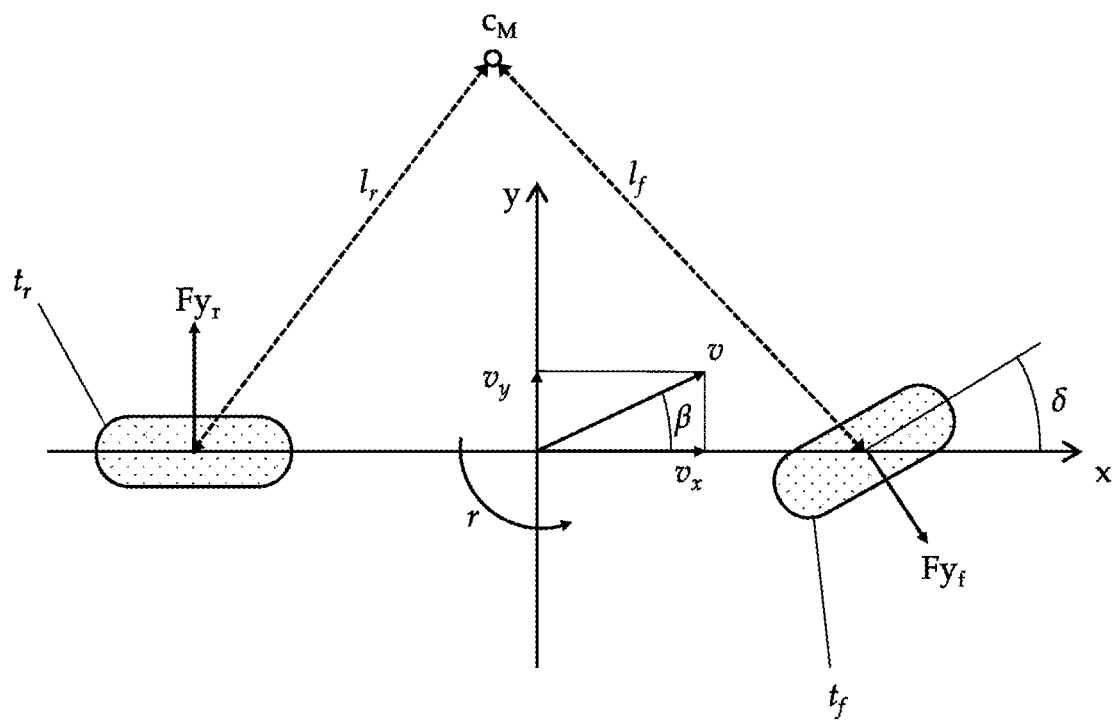
FIG. 8 is a qualitative representation of physical quantities used in the procedure for calculating the intervention area of FIG. 6.

In one embodiment, the points included in the collision areas $ICS_1$ and $ICS_2$ are calculated based on the dynamic of the vehicle V defined according to the following equations:

$$\dot{\beta} = -\frac{C_r + C_f}{mv}\beta + \left(-1 + \frac{C_r l_r - C_f l_f}{mv^2}\right)r + \frac{C_f}{mv}\delta, \quad (1)$$

$$\dot{r} = \frac{C_r l_r - C_f l_f}{J}\beta - \frac{C_r l_r^2 - C_f l_f^2}{Jv}r + \frac{C_f l_f}{J}\delta + \frac{M_Y}{J}, \quad (2)$$

$$\dot{\psi} = r, \quad (3)$$

$$\dot{x} = v\cos\psi - \beta v\sin\psi, \quad (4)$$

$$\dot{y} = v\sin\psi - \beta v\cos\psi, \quad (5)$$

$$\dot{\delta} = \text{steering speed}, \quad (6)$$

and $$\dot{v} = \text{acceleration command} \quad (7)$$

where—as schematically illustrated in FIG. 8—$\beta$ is the drift angle, that is the angle that is formed between the speed vector v of the vehicle and its longitudinal axis; $C_r$ and $C_f$ are the so-called "cornering stiffness" or the relations that occur between the lateral slippage of the rear $t_r$ and front $t_f$ wheels respectively, and the lateral force $Fy_r$ and $Fy_f$, respectively, exerted on the wheels; v is the modulus of the speed of advancement of the vehicle V; m is the mass of the vehicle V; $\delta$ is the steering angle at the wheels $t_r$ and $t_f$; $l_f$ and $l_r$ are the distances between the centre of mass cm of the vehicle V and the front and rear axle of the vehicle V, respectively, J is the moment of inertia of the vehicle, r is the yaw rate of the vehicle, and $M_Y$ is the additional yaw moment caused by a differential braking. In addition, $\dot{\delta}$ denotes the steering speed and $\dot{v}$ is the acceleration command provided by the driver.

In particular, the points included in the collision areas $ICS_1$ and $ICS_2$ are calculated as the points for which all possible control sequences executable by the driver, for $ICS_1$, and all possible control sequences executable by the control unit 30, for $ICS_2$, lead to reaching/crossing of the edge pM1 starting from the current dynamic of the vehicle V based on the theory of the reachability as defined in the following documents Kolmanovsky and E. G. Gilbert, "*Theory and computation of disturbance invariant sets for discrete-time linear systems*", Mathematical Problems in Engineering, vol. 4, no. 4, pages 317-367, 1998, I. Mitchell, "*Comparing forward & backward reachability as tools for safety analysis*" in Hybrid Systems Computation and Control. Springer, 2007, pages 428-443, and T. Fraichard and H. Asama, "*Inevitable Collision States—A step towards safer robots?*" Advanced Robotics, vol. 18, no. 10, pages 1001-1024, 2004, which are incorporated herein for reference.

In the example considered, it is not possible to obtain a closed form of the trajectories in the state space—that is, the variables that appear in derivative form in the equations 1-7—that lead to reaching or crossing of the edge pM1 starting from the relations 1-7. Accordingly, the module ICS 101 is configured to use the relation 1-7 to solve the following numerical system:

$$ICS = \{s_0 \mid \forall \tilde{u} \in \mathcal{U} \exists\, t \in [0, \infty): s(t) \in \mathcal{K}\}, \quad (8)$$

where $s_0$ the initial points-included in the set of track points pT—of the trajectories that bring vehicle V to a point of the edge pM1 or beyond the edge pM1 (i.e., the vehicle V reaches the set of non-track points pN), $\mathcal{K}$ is the set of the collision states, $\mathcal{U}$ is the set of the possible control actions executable by the driver for the first collision area $ICS_1$ or by the control unit 30 for the second collision area $ICS_2$ and $\bar{u}$ is one of the control actions included in the set $\mathcal{U}$.

The set of maximal reachable points—or maximal reachable set—$\mathcal{R}$ starting from the initial points _xD835_xDC94_xD835_xDFCE_ in which the vehicle V is located is defined as follows:

$$\mathcal{R}(s_0, t) = \left\{s(t) \in \mathcal{S} \mid \exists\, \tilde{u} \in \mathcal{U}: s(t) = \int_0^t f(s, u)dt \text{ with } s(0) = s_0\right\}, \quad (9)$$

and a set of reachable points for which there is no collision with the edge—or collision aware reachable set—$\mathcal{R}^{\bar{\mathcal{K}}}$ is defined in the following way:

$$\mathcal{R}^{\bar{\mathcal{K}}}(s_0, t) = \{s(t) \mid \exists\, \tilde{u} \forall\, \tau \in [0, t]: s(\tau) \notin \mathcal{K}\}, \quad (10)$$

Where τ denotes the time variable comprised between 0 and t.

The collision areas $ICS_1$ and $ICS_2$ are therefore defined as:

$$s_0 \in ICS \Leftrightarrow \exists\, t \in [0, \infty): \mathcal{R}^{\bar{\mathcal{K}}}(s_0, t) = \emptyset. \quad (11)$$

Advantageously, the definition of the collision areas $ICS_1$ and $ICS_2$ is performed by the module ICS 101 through a recursive formulation of the solution, discretizing the time.

Below is reported a pseudo code of the calculation of the collision areas $ICS_1$ and $ICS_2$ performed by the module ICS 101, according to an embodiment of the present invention.

Input:
    State space(S)—corresponding to the set of track points pT,
    forbidden geographic area (K)—corresponding to the set of non-track points pN,
    step of time discretization Δt,
    set of possible corrective actions U that can be performed by the driver for the first collision area $ICS_1$ or by the control unit 30 for the second collision area $ICS_2$ Pseudo-Algorithm:

```
Initialization:
R_0^K = empty set,
k = 0,
Repeat:
k ← k + 1,
X_s ← R_{k+1}^K ∪ K,
X_f ← X_s -{effect of all control actions},
R_k^K ← {s_k|∃s_f ∈ X_f: s_k = s_f - [free movement]},
Until:
R_k^K = R_{k+1}^K,
Return:
ICS = R_k^K ∪ K ∩ S.
```

In particular, with step $$X_f \leftarrow X_s$$

the states that can be avoided with the available control actions are excluded from the set $X_f$. The operation consists of a difference according to Pontryagin. In detail, considering a function of modification of the trajectory as a function of the possible control actions $g(\mathcal{U})\Delta t$, it is determined whether it is possible to identify a vector that avoids the set $R_k^K$ calculated in the previous iteration, starting from a specific point, that point is excluded from the set $R_{k+1}^K$ calculated in the current iteration.

In addition, with step $$R_k^K \leftarrow \left\{s_k \mid \exists\, s_f \in X_f: s_k = s_f - [\text{free movement}]\right\}$$

the free movement is reversed—that is, the evolution of the vehicle V without considering the entries, i.e. the commands provided by the driver or by the system 1—to extend the collision area. In other words, the free movement is integrated in time backwards instead of forwards. This is equivalent to starting from an end point, e.g. a point of the edge pM1, and tracing the trajectory of the vehicle backwards until reaching the starting point of the same.

The algorithm is repeated until the collision area no longer grows between two successive iterations, i.e. $R_k^K = R_{k+1}^K$.

Finally, the overall collision area ICS can be defined as the union of the set $R_k^K$ with the forbidden geographic area K and the intersection with the state space S, that is $ICS = R_k^K \cup K \cap S$.

The intervention area Zi is calculated (step 10057) as the sub-set of points of the set of track points pT included in the difference between the first collision area $ICS_1$ and the second collision area $ICS_2$ In other words, the collision areas $ICS_1$ and $ICS_2$ are similar to a dynamic "widening" of the physical boundary not to cross, i.e. the edge of the racetrack P. The more the vehicle V "points" towards the physical boundary—that is, the more the direction of advancement and, more generally, the dynamic bring the vehicle V towards one of the edges of the racetrack P—, the more this boundary must be widened or, similarly, "approached" to the vehicle V, thus generating a virtual puffer area that allows to correct the dynamic of the vehicle V and avoid a racetrack exit.

The intervention area Zi thus calculated is communicated (step 10059) to the module RG 102.

When the module RG 102 determines that the vehicle V—in particular, the position of its centre of mass—is within the intervention area Zi calculated by the module ICS 101 (at step 1007), the position and the dynamic of the vehicle V are used as a starting point to generate the exit trajectory that allows to keep the edges of the vehicle V within the racetrack P.

In particular, in calculating the exit trajectory (performed in step 1011 of method 1000) it is fundamental to ensure the continuity of the control variables. In a preferred embodiment, the module RG 102 is configured to calculate the formulation exit trajectory starting from a problem in differential mode (or velocity form).

In the example in question, the exit trajectory is calculated as the solution of the following relation:

$$\max_{u} \sum_{t \in T} d_{ost}(x(t)), \quad (12)$$

such that:

$$\dot{x} = f(x, u), \quad (13)$$

and $$d_{ost}(x(t)) > d_{min}, \quad (14)$$

where t denotes the time, T is the prediction period, where f(x,u) represents the vehicle dynamic, $d_{ost}(x)$ is the distance between the vehicle V is the edge of the racetrack P from which the collision areas ICS1 and ICS2 extend—usually, corresponding to the closest edge—, $d_{min}$ is a threshold distance value allowed between the vehicle and the edge of the racetrack—for example greater than or equal to half the width of the vehicle V—, x represents the position of the vehicle in space, and u comprises the variables controllable by the control unit 30 allowed by the control configuration in use.

It can be observed that the prediction period T is defined by the calculation ability of the control unit 30 and, in general, the longer the prediction period T the better the calculated trajectory. However, the relation (12) is solved at each sampling instant in a "receding horizon" logic, therefore it is not necessary that the prediction period T comprises the time necessary for the vehicle to reach an edge (for example, the obstacle or the boundary of the racetrack at a curve). Studies carried out by the Applicant have made it possible to determine that a prediction period of the order comprised between 1 and 3 seconds is sufficient to provide sufficiently accurate predictions.

The trajectory calculated by the module RG 102 is communicated to the module VDC 103 to modify the dynamic of the vehicle V (at step 1013 of the method 1000) so as to follow this trajectory. In particular, the module VDC 103 operates substantially as a closed-loop control system that has the task of actuating the actuators 10 to follow the trajectory calculated by the module RG 102.

The module VDC 103 also implements the return of the control of the vehicle V to the driver (performed at step 1015 of method 1000). In the example considered, the module VDC 103 is configured to return the control to the driver only when the vehicle has exited the first collision area ICS1 (i.e. the area of greatest amplitude) and the commands to the actuators 10—i.e. the control variables—that the module VDC 103 is calculating are substantially corresponding to the commands that the driver is imposing through the vehicle V by means of steering wheel, pedals and/or other input elements. In particular, the commands of the driver comprise one or more among the acceleration imposed on the vehicle V—determined based on the position of the accelerator pedal thanks to throttle-by-wire technology, the braking torque—determined by measuring the pressure in the brake pump, the steering torque—that is a measure of the torque applied by the driver on the steering. In detail, when the values of the imposed acceleration and/or of braking torque are corresponding to the values imposed by the module VDC 103, and/or when the steering torque is lower than a predetermined threshold value (indicative of the fact that the driver is holding the steering wheel without trying to counteract the action of the module VDC 103), then the driver is considered ready to resume control of the vehicle V and the module VDC 103 transfers the control to the driver—i.e., stops sending commands to the actuators.

However, it is clear that the above examples must not be interpreted in a limiting sense and the invention thus conceived is susceptible of numerous modifications and variations.

For example, the map may comprise in the set of non-track points obstacles present on the racetrack. To this end, in one embodiment, the system is configured to detect and/or receive information about the state of the racetrack and/or the presence of obstacles/vehicles within it and update the map accordingly. For example, the map may be updated as soon as the state of the racetrack and/or the presence of obstacles/vehicles undergo a variation, or the map may be updated periodically. In this case, the system will determine the collision areas considering the obstacle, so as to intervene with a trajectory correction if the driver reaches a position from which he or she is not able to avoid the obstacle by acting only on the actuators under his or her control.

In an alternative embodiment, the creation of the map can be carried out directly by the control unit of the vehicle and verified/modified by an operator or by the driver himself or herself through a vehicle user interface. In other words, the vehicle can define the map and, in particular, the allowed track within which the vehicle must move, by uploading information (e.g., the map itself) previously processed by an external device or by directly processing geographic data, images and/or user input in order to obtain such a map.

As will be apparent to the person skilled in the art, one or more steps of the above-described method may be performed in parallel with each other or in an order different from that presented above. Similarly, one or more optional steps can be added or removed from one or more of the procedures described above.

Naturally, all the details can be replaced with other technically-equivalent elements.

In conclusion, the materials used, as well as the shapes and contingent dimensions of the devices, apparatuses and terminals mentioned above, may be any according to the specific implementation needs without thereby departing from the scope of protection of the following claims.

The invention claimed is:

1. A method of automatic confinement of a land vehicle comprising a control unit, a plurality of sensors configured to measure quantities indicative of a vehicle dynamic, at least one actuator configured to influence the dynamic of the vehicle, said plurality of sensors and said at least one actuator being connected to the control unit), the method comprising that the control unit performs steps of:
defining a set of points of a track within which the vehicle is free to move, said track including at least one edge that defines a boundary of the track that must not be crossed by the vehicle,
determining a vehicle dynamic based on the information provided by the plurality of sensors,
determining a spatial position of the vehicle based on the information provided by the plurality of sensors,
calculating an intervention area of the track based on the position and dynamic of the vehicle, and of the position from the at least one edge, the intervention area being contained within the track,
determining whether the vehicle is at least partially in the intervention area, and
in an affirmative case, controlling said at least one actuator to modify the vehicle dynamic to perform an exit maneuver that brings the vehicle outside said intervention area,
wherein calculating an intervention area comprises:
calculating a first collision risk area based on the current position and dynamic of the vehicle, the position from the at least one edge and an ability of the driver to modify the vehicle dynamic by acting on said at least one actuator,
calculating a second collision risk area based on the current position and dynamic of the vehicle, the position from the at least one edge and an ability of the control unit to modify the vehicle dynamic acting on said at least one actuator, wherein said first collision risk area and said second collision risk area correspond to regions of the track within which reaching and/or crossing said at least one edge is inevitable when the vehicle moving according to the current dynamic is driven by the driver or by the control unit, respectively, and
defining the intervention area as the area resulting from the difference between the first collision risk area and the second collision risk area.

2. The method according to claim 1, further comprising a step of determining the ability of the driver to modify the vehicle dynamic:
by selecting at least one value indicative of the ability to modify vehicle dynamic from a set of predetermined values, or
measuring at least a value indicative of the ability to modify the dynamic of the vehicle while the driver is driving said vehicle.

3. The method according to claim 2, wherein said value indicative of the ability to modify the dynamic of the vehicle comprises at least one of:
a maximum steering speed, a
maximum braking, and maximum acceleration that are performed by the driver.

4. The method according to claim 1, wherein the steps of calculating a first collision risk area and a second collision risk area each comprise calculating a sub-set of points starting from which any trajectory that can be set by the driver or by the control unit, respectively, leads to reaching/ crossing of the at least one margin based on the vehicle dynamic according to the reachability problem.

5. The method according to claim 1 wherein said at least one edge corresponds to the edge of the track intersected by the direction of advancement of the vehicle, or the edge of the track which is less than a threshold distance value from the vehicle position.

6. The method according to claim 1, wherein the step of defining a set of points of a track within which the vehicle is free to move comprises:
acquiring geographic data relating to a geographic area comprising said track;
identifying the geographic coordinates of said track based on the geographic data acquired;
defining the geographic coordinates as the points of the track;
defining the remaining geographic coordinates as points not belonging to the track, and identifying said at least one edge as a subset of the points of the track adjacent to each other and to at least one point not belonging to the track.

7. The method according to claim 6, further comprising the step of adding to the set of points of the track the coordinates of at least an additional area adjacent to a portion of the set of points of the track, said additional area being suitable for the transit of the vehicle.

8. The method according to claim 1, wherein the step of controlling said at least one actuator for modifying the dynamic of the vehicle comprises:
calculating an exit trajectory from the intervention area based on the current position and dynamic of the vehicle, and the distance of the vehicle from the at least one edge, and executing said exit maneuver by controlling said at least one actuator to follow said exit trajectory.

9. The method according to claim 8, wherein the exit trajectory is calculated as a solution of the following relation:

$$\max_{u} \sum_{t \in T} d_{ost}(x(t)),$$

such that $$\dot{x} = f(x, u),$$
$$d_{ost}(x(t)) > d_{min},$$

where t denotes time, T is the prediction period, where f(x, u) represents the vehicle dynamic, $d_{ost}$ (x) is the distance between the vehicle and the at least one margin, $d_{min}$ is a threshold distance value allowed between the vehicle and said at least one edge, x represents the position of the vehicle in space, and u represents at least one dynamic variable controllable by means of said at least one actuator.

10. A vehicle comprising: a control unit, a plurality of sensors configured to measure quantities indicative of a vehicle dynamic, at least one actuator configured to influence the dynamic of the vehicle, said plurality of sensors and said at least one actuator being connected to the control unit, and wherein the control unit is configured to perform the method according to claim 1.

* * * * *